Patented Oct. 3, 1939

2,175,079

UNITED STATES PATENT OFFICE 2,175,079

TREATMENT OF WELLS

Willard H. Dow, Midland, Mich., assignor to The Dow Chemical Company, Midland, Mich., a corporation of Michigan No Drawing. Application July 6, 1937, Serial No. 152,143

4 Claims. (Cl. 166—21)

The invention relates to the treatment of wells, particularly those yielding oil or gas, to facilitate the flow of fluid therefrom. It more particularly concerns the treatment of wells drilled into a calcareous formation.

It is a matter of common observation that the yield of an oil or gas well declines more or less in time due to various causes apart from actual depletion of the oil or gas in the surrounding formation. Among the causes which affect the decline in yield is the accumulation of obstructing matter in the channels or interstices of the formation through which the oil or gas reaches the well. These accumulations are often acid-soluble. As a method of restoring the rate of flow of fluid to the well in such cases, it has been proposed to introduce hydrochloric acid through the well bore into the surrounding formation. The hydrochloric acid dissolves the acid-soluble deposits in the interstices of the formation and, when the latter is itself acid-soluble, the acid may also dissolve the walls of the pore passages and thereby increase their permeability to the flow of mineral fluid. Although this method is generally effective to increase the output of wells drilled into calcareous formations, many cases are on record wherein the output has not been materially increased by conventional acid treatments, even though the formations were substantially soluble in hydrochloric acid. Experiments in which cores taken from a variety of calcareous formations were treated with hydrochloric acid show that, when the cores are quite soluble in hydrochloric acid, the acid may become neutralized before it penetrates deeply into the core.

I have found that these observations substantiate the view that hydrochloric acid solutions usually cannot be injected deeply into a calcareous formation surrounding a well before the acid becomes neutralized. The effect of the acid on the formation, therefore, appears to be confined largely to the region immediately surrounding the well bore instead of upon the more outlying portions. This is further evidenced by the fact that, when the spent acid is withdrawn, it is fully neutralized even though the production of the well may not have been increased. It is believed that the acid in such cases has merely acted upon the formation in the immediate vicinity of the well bore rather than upon the outlying portions, because it becomes neutralized before these can be reached. The permeability of the producing formation, then, is not increased over a sufficiently extensive area to cause an increase in the flow of oil to the well.

It is an object of the invention to provide a method of acidizing wells wherein the effect of the acid is extended well beyond the immediate vicinity of the well bore into the outlying portions of the formation, whereby the flow of the oil to the well from these portions is facilitated. Other objects and advantages will become apparent as the description proceeds.

I have now found that the permeabilty of calcareous formations, and hence the flow of mineral fluid therethrough to a well, can be greatly increased over a comparatively wide area surrounding the well bore by introducing into the well and thence into the formation a quantity of an aqueous acid solution of the type characterized by a pK value of between about 2 and 4.5. By the term "pK value" there is meant the pH value of the acid solution when 50 per cent of it has become neutralized, that is to say an acid having a pK value of between 2 and 4.5 would have a pH value of between 2 and 4.5 when 50 per cent of it had been neutralized by reacting with an alkali, such as limestone, dolomite, or like calcareous matter. The use and meaning of the foregoing term is fully set forth in Chapters 1 and 2 of "The Determination of Hydrogen Ions" by W. Mansfield Clark, published by The Williams and Wilkins Co. in 1928. I have found that when such an acid solution is introduced into the formation, its action upon the calcareous matter thereof is comparatively slow and instead of becoming neutralized more or less immediately its acidity persists for a sufficient time, though in contact with calcareous matter, to permit the acid to penetrate deeply into the formation. Although such acids act relatively slowly on calcareous matter, their potential solvent power therefor is relatively great so that a large amount can be dissolved and longer drainage channels to the well can be produced with a much smaller total consumption of acid than when a strong mineral acid, such as hydrochloric, is employed. The following are illustrative examples of acids suitable for the purpose: mono-chloracetic, alpha- and beta-chlorpropionic, lactic, nitrous and the like. These acids have pK values of 2.8, 2.8, 4.1, 3.9, and 3.4, respectively. The ionization constants of the acids specifically mentioned above are: $1.55 \times 10^{-3}$, $1.47 \times 10^{-3}$, $8.59 \times 10^{-5}$, $1.38 \times 10^{-4}$, and $4 \times 10^{-4}$, respectively. They may be employed in aqueous solution in a concentration of from about 5 to 25 per cent and preferably in a concentration of between about 10 and 20 per cent.

In carrying out the invention the following procedure may be employed:—The well is first filled with oil and then the charge of an acid having the specified pK value is introduced into the tubing and the oil displaced therefrom by the acid is allowed to flow from the casing head. When the acid has filled the bottom of the well, the casing is closed to prevent further displacement of oil from the well. By so doing the acid is prevented from rising in the bore and attacking the casing seat. Then the introduction of acid may be continued until the entire charge has been introduced into the well. For example, a charge of from 500 to 2,000 gallons or more of the aqueous acid solution may be employed, depending upon the extent to which it is desired to treat the surrounding formation. After the charge of acid has been introduced into the tubing, it may be followed by a quantity of oil or pressure may be applied to displace the acid from the tubing and insure delivering all of it into the formation. Pressure, if necessary, is maintained upon the oil in the tubing for a sufficient time to hold the acid in the formation until its reaction therein is substantially completed, usually in about 5 to 24 hours. The pressure is then released and the well may be put on production as by pumping or allowing it to flow. The foregoing method of introducing the acid is merely illustrative of a suitable procedure. Any other mode of introduction which insures the delivery of the acid into the formation may be employed, if desired.

Among the advantages of my invention are that ineffective expenditure of acid in the immediate vicinity of the well bore is minimized and, instead, a larger proportion of the acid penetrates deeply into the surrounding formation before it becomes neutralized by the calcareous matter therein. As a consequence longer flow channels are produced, greatly facilitating the flow of oil or gas to the well from outlying portions of the formation which are not reached by the acids heretofore proposed before they become neutralized.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. A method of treating a well penetrating a calcareous earth formation which comprises introducing into the well a charge of an aqueous solution of a weak acid having an ionization constant between $8.59 \times 10^{-5}$ and $1.55 \times 10^{-3}$ and applying pressure to the charge to force it into the formation.

2. A method of treating a well penetrating a calcareous earth formation which consists in introducing into the well a charge of an aqueous solution of chlor-acetic acid, applying pressure to the charge to force it into the formation, holding the acid solution in the formation until reaction is completed, and putting the well on production.

3. A method of treating a well penetrating a calcareous earth formation which consists in introducing into the well a charge of an aqueous solution of mono-chlorpropionic acid, applying pressure to the charge to force it into the formation, holding the acid solution in the formation until reaction is completed, and putting the well on production.

4. A method of treating a well penetrating a calcareous earth formation which consists in introducing into the well a charge of an aqueous solution of nitrous acid, applying pressure to the charge to force it into the formation, holding the acid solution in the formation until reaction is completed, and putting the well on production.

WILLARD H. DOW.